A. COLOMBOT.
FLY PAPER HOLDER.
APPLICATION FILED JAN. 12, 1914.
1,114,861.
Patented Oct. 27, 1914.
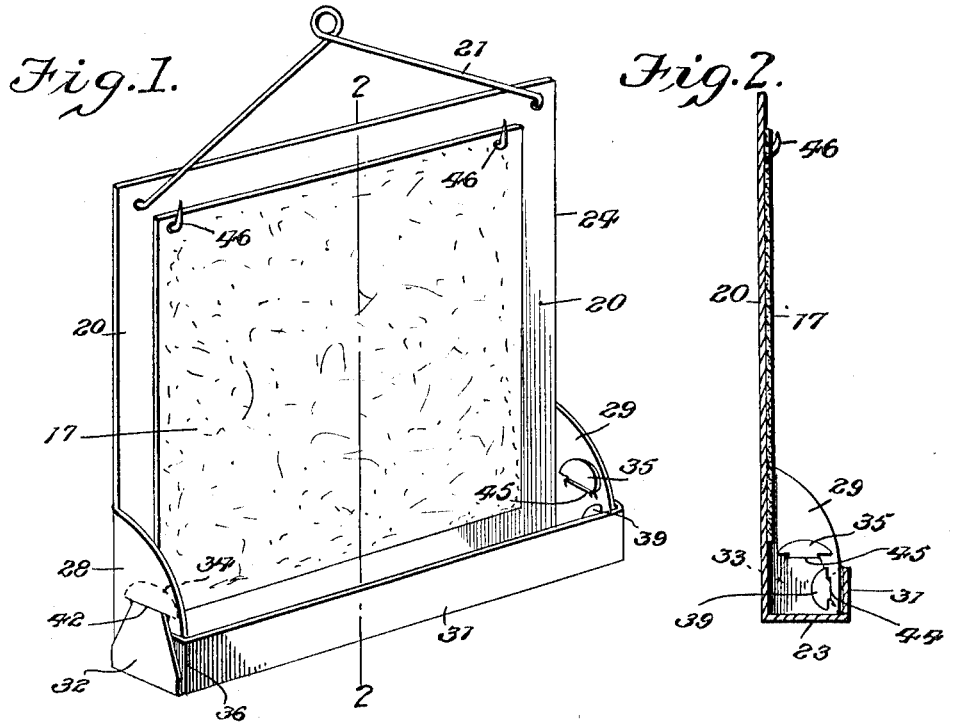
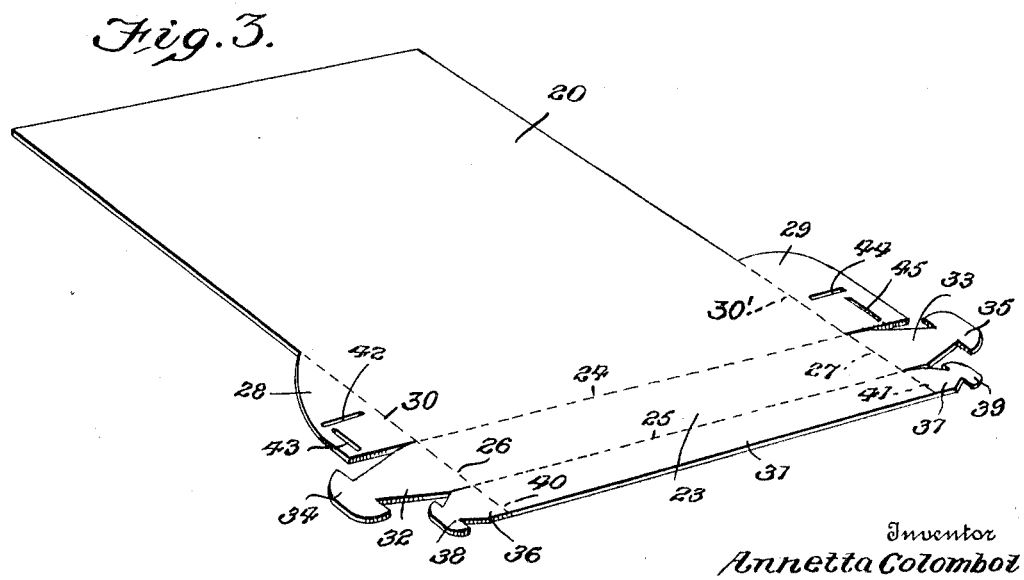
Witnesses
C. N. Woodward
Inventor
Annetta Colombot
By
Attorneys

UNITED STATES PATENT OFFICE.

ANNETTA COLOMBOT, OF MADISON, CONNECTICUT.

FLY-PAPER HOLDER.

1,114,861. Specification of Letters Patent. Patented Oct. 27, 1914.

Application filed January 12, 1914. Serial No. 811,650.

*To all whom it may concern:*

Be it known that I, ANNETTA COLOMBOT, citizen of the United States, residing at Madison, in the county of New Haven and State of Connecticut, have invented certain new and useful Improvements in Fly-Paper Holders, of which the following is a specification.

This invention relates to improvements in devices for supporting an insect destroying medium, and has for one of its objects to provide a simply constructed device whereby the destroying medium may be supported without the necessity for handling the same either in applying it to the holder or removing it therefrom.

Another object of the invention is to provide a simply constructed device whereby insects which escape from the holder are caught and destroyed.

Another object of the invention is to provide a simply constructed device of this character wherein the parts are arranged to supplement and reinforce each other and prevent accidental displacement when in use.

With these and other objects in view the invention consists in certain novel features of construction as hereinafter shown and described and then specifically pointed out in the claim, and in the drawings illustrative of the preferred embodiment of the invention.

Figure 1 is a perspective view of the improved device with the insect destroying or trapping medium attached. Fig. 2 is a sectional elevation on the line 2—2 of Fig. 1. Fig. 3 is a perspective view of the blank from which the body of the device shown in Figs. 1 and 2 is constructed.

Corresponding and like parts are referred to in the following description and indicated in all the views of the drawings by the same reference characters.

The improved device comprises a body adapted to support an insect attracting and trapping element associated with a receptacle to receive any insects or material or objects which may be detached from the attracting and trapping element and thus insure the destruction of the insects, and to prevent the material or objects from falling to the floor.

The supporting body is in the form of a plate 20 having a suspending bail 21 and bent at its lower edge into a receptacle which is formed integral with the body portion 20, the whole device being preferably constructed from a blank sheet, such as heavy paper, and cut as shown in Fig. 3. The bottom 23 of the receptacle is defined by the space between the dotted lines 24, 25, 26 and 27, and the ends 28—29 of the receptacle by the dotted lines 30 and 30', while the front 31 of the receptacle is defined by the portion of the sheet externally of the line 25, the dotted lines denoting the "folds" necessary to produce the receptacle. Tongues 32—33 extend externally of the lines 26—27 and are formed with barbed terminals 34—35, while the smaller tongues 36—37 extend from the ends of the front 31 of the receptacle and terminate in barbs 38—39. The tongues 36—37 are defined from the front 31 by dotted lines 40—41. The tongue 28 is provided with clefts 42—43 to receive the barbs 34—38 of the tongues 32—36, while the end 29 is provided with similar clefts 44—45 to receive the barbs 35—39 of the tongues 33—37. It will be noted that the relatively short barbed projections 36—37 bear against the outer faces of the ends 28—29, while the relatively long barbed projections 32—33 bear over the shorter projections and engage by their barbs in the clefts 42—44, thus reinforcing and supporting the shorter projections and prevent their accidental displacement when in use. This is an important feature of applicant's device and materially increases its efficiency and utility.

The improved device may be furnished to the trade or sold to the user in the form shown in Fig. 3 and then bent in the required shape ready for use by simply bending the different portions at right angles to the body 20 and passing the barbs 38—39 through the clefts 43—45 and then inserting the barbs 34—35 through the clefts 42—44, this operation forming the receptacle at the lower end of the body 20 as represented in Figs. 1 and 2. The body 20 is provided with hooks or like supporting devices 46 from which the insect attracting medium 17 is suspended. By this simple means the insect attracting medium is in position to be freely accessible to the insects, while at the same time the attracting medium may be applied or removed without the necessity for contacting with the sticky surface.

Having thus described the invention, what is claimed as new is:

In a device of the class described a body adapted to support an insect attracting and trapping element with a portion folded to form the bottom and front of a receptacle, the portion forming the bottom having relatively long barbed projections and the portion forming the front having relatively short barbed projections, ends for the receptacle projecting from the body and having clefts at right angles to each other to receive the barbs of the projections, the shorter projections of the front portion of the body adapted to be folded against the folded ends and to engage by their barbs in one set of said clefts and the longer projections of the bottom portion adapted to fold over the folded shorter projections and against the ends of the body and engage by their barbs in the other set of clefts and thus hold or support the shorter projections in place.

In testimony whereof I affix my signature in presence of two witnesses.

ANNETTA COLOMBOT. [L. S.]

Witnesses:
WELLINGTON E. FRANCIS,
J. MYRON HULL.

---

Copies of this patent may be obtained for five cents each, by addressing the "Commissioner of Patents, Washington, D. C."